United States Patent
Ha et al.

(10) Patent No.: US 6,493,051 B2
(45) Date of Patent: Dec. 10, 2002

(54) TRANSFLECTIVE LIQUID CRYSTAL DISPLAY DEVICE

(75) Inventors: Kyoung-Su Ha, Seoul (KR); Heume-II Baek, Seoul (KR); Yong-Beom Kim, Kyonggi-do (KR)

(73) Assignee: LG Philips LCD Co., Ltd., Seoul (KR)

( * ) Notice: Subject to any disclaimer, the term of this patent is extended or adjusted under 35 U.S.C. 154(b) by 169 days.

(21) Appl. No.: 09/729,966

(22) Filed: Dec. 6, 2000

(65) Prior Publication Data

US 2001/0017679 A1 Aug. 30, 2001

(30) Foreign Application Priority Data

Dec. 6, 1999 (KR) .............................................. 99-55107

(51) Int. Cl.⁷ ............................................ G02F 1/1335
(52) U.S. Cl. .......................... 349/113; 349/114; 349/65
(58) Field of Search .................................. 349/113, 114, 349/65

(56) References Cited

U.S. PATENT DOCUMENTS 6,215,538 B1 * 4/2001 Narutaki et al. ............. 349/113
6,259,500 B1 * 7/2001 Kijima et al. ................ 349/113

* cited by examiner

*Primary Examiner*—James A. Dudek
(74) *Attorney, Agent, or Firm*—Birch, Stewart, Kolasch & Birch, LLP

(57) ABSTRACT

A transflective liquid crystal display device includes a liquid crystal panel, which can be used in the transparent mode and reflective mode, selectively. The transflective liquid crystal panel includes the pixel electrode having the transparent electrode and reflective electrode and the reflective film having the transmitting hole. Therefore, the light generated from the backlight device can pass through the transmitting hole and transparent electrode into the liquid crystal. Moreover, the light reflected in the reflective film can also pass through them into the liquid crystal without being absorbed by the lower polarizer. That is, the brightness of the transflective LCD device is improved.

16 Claims, 4 Drawing Sheets

TRANSFLECTIVE LIQUID CRYSTAL DISPLAY DEVICE

CROSS REFERENCE

This application claims the benefit of Korean Patent Application No. 1999-55107, filed on Dec. 6, 1999, under 35 U.S.C. §119, the entirety of which is hereby incorporated by reference.

BACKGROUND

1. Field of the invention

The present invention relates to a liquid crystal display (LCD) device, and more particularly, to a transflective LCD device.

2. Description of Related Art

In general, liquid crystal displays are divided into transmissive LCD devices and reflective LCD devices according to whether the display uses an internal or external light source.

A typical transmissive LCD device includes a liquid crystal panel and a back light device. The liquid crystal panel includes upper and lower substrates with a liquid crystal layer interposed. The upper substrate includes a color filter, and the lower substrate includes thin film transistors (TFTs) as switching elements. An upper polarizer is arranged on the liquid crystal panel, and a lower polarizer is arranged between the liquid crystal panel and the backlight device.

FIG. 1 is a partial perspective view of a transflective color LCD device.

A transflective LCD panel 11 comprises upper and lower substrates 15 and 21 opposing each other with liquid crystal 23 interposed. On the opposing surface of the upper substrate 15, color filters 17 having black matrix 16 and a transparent common electrode 13 are arranged sequentially.

The lower substrate 21 includes switching devices "T" and pixels "P" having pixel electrode 19 divided into transmissive portion 19a and reflective portion 19b.

On the lower substrate 21, a plurality of gate and data lines 25 and 27 are positioned like an array matrix, and switching devices "T" is introduced into a matrix type.

An area defined by two adjacent gate and data lines 25 and 27 is the pixel "P". On the pixel "P", the transmissive portion 19a of the pixel electrode 19 can be composed of a transmitting hole or a transparent electrode. For the transmissive portion, the transparent electrode is conventionally employed.

Conductive metallic material having the superior reflectivity is used for the reflective electrode becoming the reflective portion 19a of the pixel electrode 19, and transparent conductive metallic material having the good transmissivity such as ITO (indium tin oxide) is used for the transparent electrode of the transmissive portion 19a.

FIG. 2 is a cross-sectional view of the LCD device illustrating the operation principle of the transflective LCD device. As shown in FIG. 2, the conventional transflective LCD device 57 includes lower and upper substrates 43 and 53 with a liquid crystal layer 56 interposed there between. The upper substrate 43 has a color filter 17 (see FIG. 1), and the lower substrate 53 includes a switching device "T" (see FIG. 1), a transparent electrode 51 and a reflective electrode 49. The reflective electrode 49 is made of a conductive material having a good reflectivity and surrounds a transparent electrode 51 formed therein. The transflective LCD device 57 further includes a backlight device 41. The light transparent electrode 51 serves to transmit light "A" irradiated from the backlight device 41 and the reflective electrode 49 serves to reflect the ambient light "B".

The transflective LCD device is operable in both a reflective mode and a transmissive mode. First, in the reflective mode, the ambient light "B" from the upper substrate 43 is reflected in the reflective electrode 49 and directs toward the upper substrate 43 again. At this time, when the electrical signals are applied to the pixel electrode (49 and 51) by the switching element "T" (see FIG. 1), phase of the liquid crystal layer 56 varies and thus the reflected light is colored by the color filter 17 (see FIG. 1) and displayed in the form of colored light.

Further, in the transmissive mode, light "A" generated from the backlight device 41 passes through the transparent electrode 51. At this time, when the electrical signals are applied to the pixel electrode (49 and 51) by the switching element "T" (see FIG. 1), phase of the liquid crystal layer 56 varies. Thus, the light "A" passing through the liquid crystal layer 56 is colored by the color filter 17 (see FIG. 1) and displayed in the form of images with other colored lights.

As described above, since the transflective LCD device has both the transmissive mode and the reflective mode, the transflective LCD device can be used without depending on the time of day (e.g., noon or dusk) and has advantages that it can be used for a long time with consuming a low power.

However, the efficiency of the light from the backlight device is lowered in the transmissive mode of the transflective LCD device.

FIG. 3 is a cross-sectional view of the conventional transflective LCD device.

An upper polarizer 45 is formed on the upper substrate 43, and the lower polarizer 47 and a retardation film 50 are formed sequentially under the lower substrate 53. Moreover, the upper and lower substrates 43 and 53 opposing each other with liquid crystal 55 interposed. On the opposing surface of the lower substrate 53, the reflective electrode 49 and the transparent electrode 51 are positioned.

Referring back to FIG. 1, an area defined by two adjacent gate and data lines 25 and 27 is the pixel "P". On the pixel "P", the pixel electrode 19 is comprised of the transmissive portion or transparent electrode 19a and the reflective portion or reflective electrode 19b.

The LCD panel 57 having the upper substrate 43 and the lower substrate 53 divided into open region "E" and closed region "F" depending on whether the light "C" and "D" generated from the backlight device 41 can be transmitted via the LCD panel 57. The closed region "F" includes the opaque metallic material such as the reflective electrode 49 of the pixel electrode, the gate line 25 and data line 27 (see FIG. 1). The open region "E" includes the transparent electrode 51 of the pixel electrode.

In the transmissive mode, the light "D" generated from the backlight device 41 passes through the liquid crystal 55 and transparent electrode 51. However, the light "C" is absorbed by the lower polarizer 47 after being reflected in the reflective electrode 49, or a little of the light "C" passes through the liquid crystal 55.

FIG. 4 shows the state of light while it passes through each of the components described above.

The light generated from the backlight device 41 is first converted into linearly polarized light through the lower polarizer 47. The light, while passing through the lower polarizer 47, is absorbed except the parallel light to the transmitting axis of the lower polarizer 47. Therefore, the quantity of the light is being decreased.

The linearly polarized light is changed into left-circularly polarized light through the retardation film 50 having a phase difference λ/4. Some of the left-circularly polarized light passes through the liquid crystal 55 (see FIG. 3) of the open portion "E", and the other of the left-circularly polarized light is reflected in the reflective electrode 49. At this time, the left-circularly polarized light is changed into the right-circularly polarized light due to the mirror effect. The right-circularly polarized light enters into the retardation film 50 again, and is converted into the linearly polarized light having a phase difference angle of 45 degrees.

That is, when the linearly polarized light enters into the lower polarizer 47, it is perpendicular to the transmitting axis of the lower polarizer 47. Therefore, the lower polarizer 47 absorbs most of the light.

As a result, the conventional transflective LCD device causes the decrease of the brightness since the closed portion "F" having the reflective electrode, gate line and data line absorbs the light.

SUMMARY OF THE INVENTION

Accordingly, the present invention is directed to a transflective liquid crystal display device that substantially obviates one or more of the problems due to limitations and disadvantages of the related art.

An object of the invention is to provide a transflective LCD device which can increase the brightness.

In accordance with the purpose of the invention, as embodied and broadly described, in one aspect the invention includes a transflective liquid crystal display device, including: upper and lower substrates opposing each other; a pixel electrode formed on the lower substrate and having reflective and transmitting portions; liquid crystal interposed between the upper substrate and the lower substrate; a backlight device providing light to the pixel electrode; and a reflective film for preventing the light from the backlight device from radiating to the reflective portion of the pixel electrode.

The transflective LCD device also has a lower polarizer under the lower substrate and the reflective film formed under the lower polarizer and having a transmitting hole corresponding to the transmitting portion of the pixel electrode. The area of the transmitting hole is smaller than that of the transmitting portion of the pixel electrode.

The lower substrate can be located under the reflective film and the lower polarizer. In the transflective LCD device, the reflective portion is made of the metallic material selected from a group composing of Aluminum, Tungsten, Molybdenum and the like. The transmitting portion is made of transparent conductive metallic material and can be replaced with a hole surrounded by the reflective portion.

In accordance with the purpose of the invention, in another aspect the invention provides a transflective liquid crystal display device, including: an upper substrate; an upper polarizer on the upper substrate; color filters under the upper substrate; a common electrode under the color filters; liquid crystal layer under the common electrode; a switching device under the liquid crystal; a pixel electrode, under the liquid crystal, having the transmitting and reflective portions and having an electrical connection with the switching device; a lower substrate under the pixel electrode; a lower polarizer under the lower substrate; a reflective film, under the lower polarizer, having a transmitting region; and a backlight device, under the reflective film, irradiating the light.

The transflective LCD device makes the light from the backlight pass through the transmitting region of the reflective film and transmit the transmitting portion of the pixel electrode. In the transflective LCD device, the area of the transmitting region for example a transmitting hole is smaller than that of the transmitting portion of the pixel electrode.

In accordance with the purpose of the invention, in another aspect the invention provides a transflective liquid crystal display device, including: an upper substrate; an upper retardation film on the upper substrate; an upper polarizer on the upper retardation film; color filters under the substrate; a common electrode under the color filters; liquid crystal layer under the common electrode; a switching device under the liquid crystal; a pixel electrode, under the liquid crystal, having the transmitting and reflective portions and having an electrical connection with the switching device; a lower retardation film under the pixel electrode; a lower polarizer under the lower retardation film; a reflective film, under the lower polarizer, having a transmitting region; a substrate under the reflective film; and a backlight device, under the lower substrate, irradiating the light.

The transflective LCD device makes the light from the backlight device pass through the transmitting region of the reflective film and transmit the transmitting portion of the pixel electrode into liquid crystal.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Reference will now be made in detail to the preferred embodiment of the present invention, example of which is illustrated in the accompanying drawings.

Figure 1:
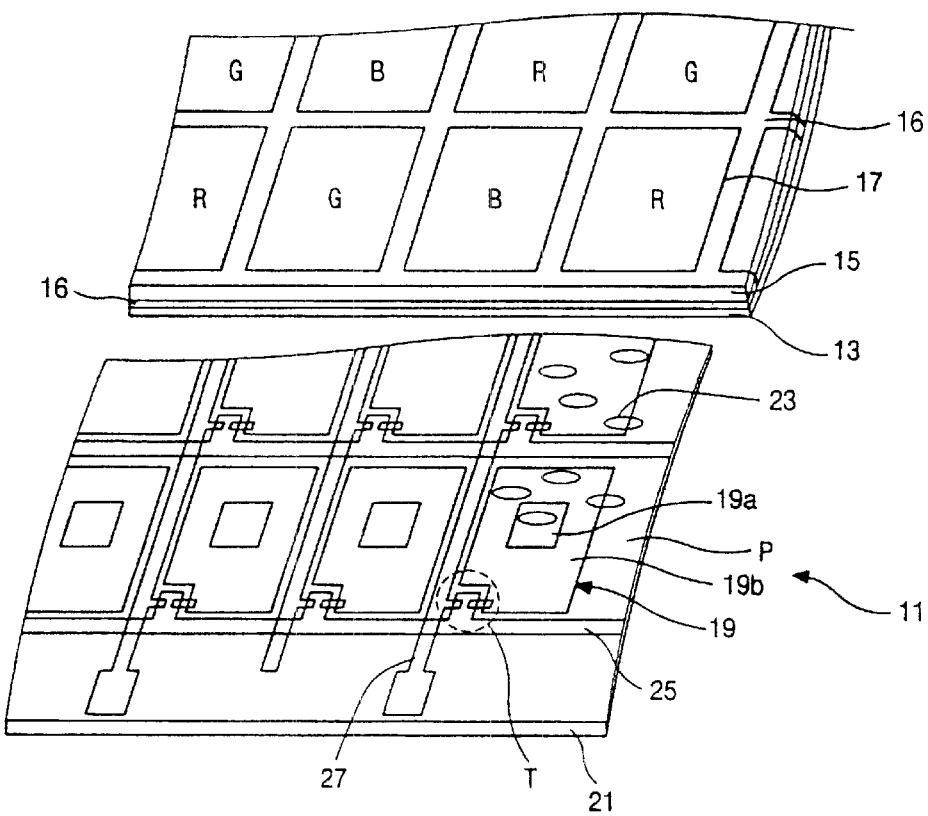
FIG. 1 is a partial perspective view illustrating a general transflective LCD device.
Figure 2:
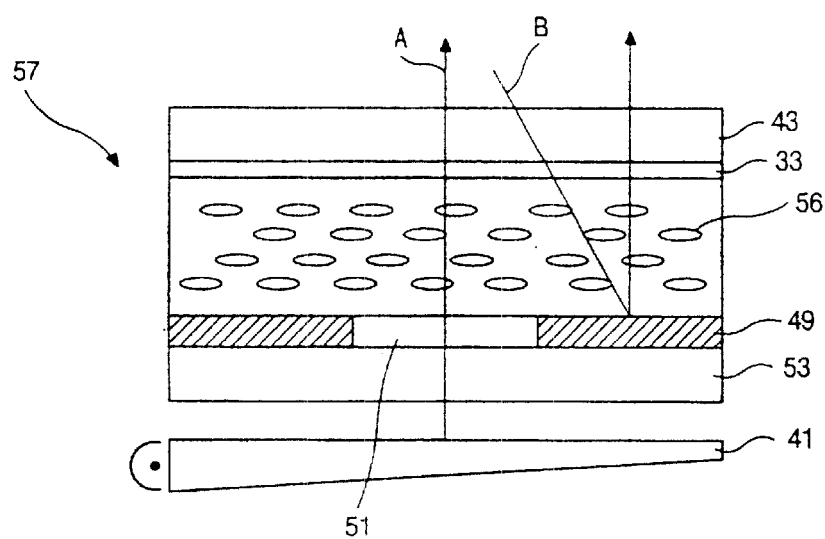
FIG. 2 is a cross-sectional view illustrating a general transflective LCD device.
Figure 3:
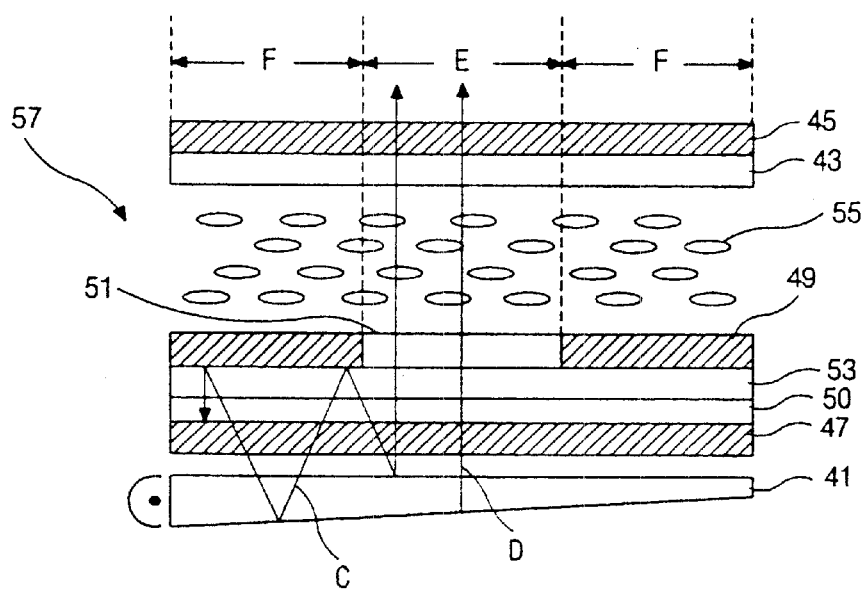
FIG. 3 is a cross-sectional view illustrating a conventional transflective LCD device.
Figure 4:
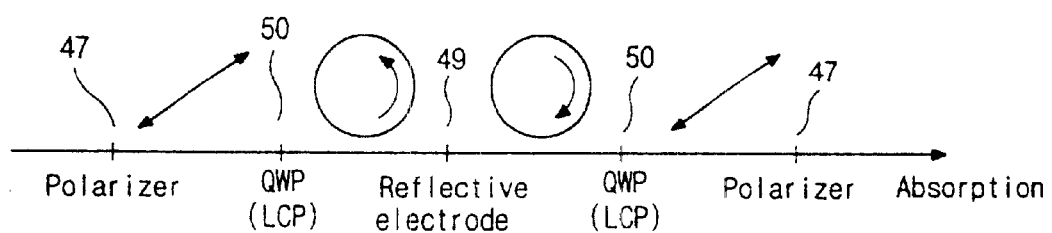
FIG. 4 is a schematic view illustrating the state of light while it passes through each component of a conventional transflective LCD device.
Figure 5:
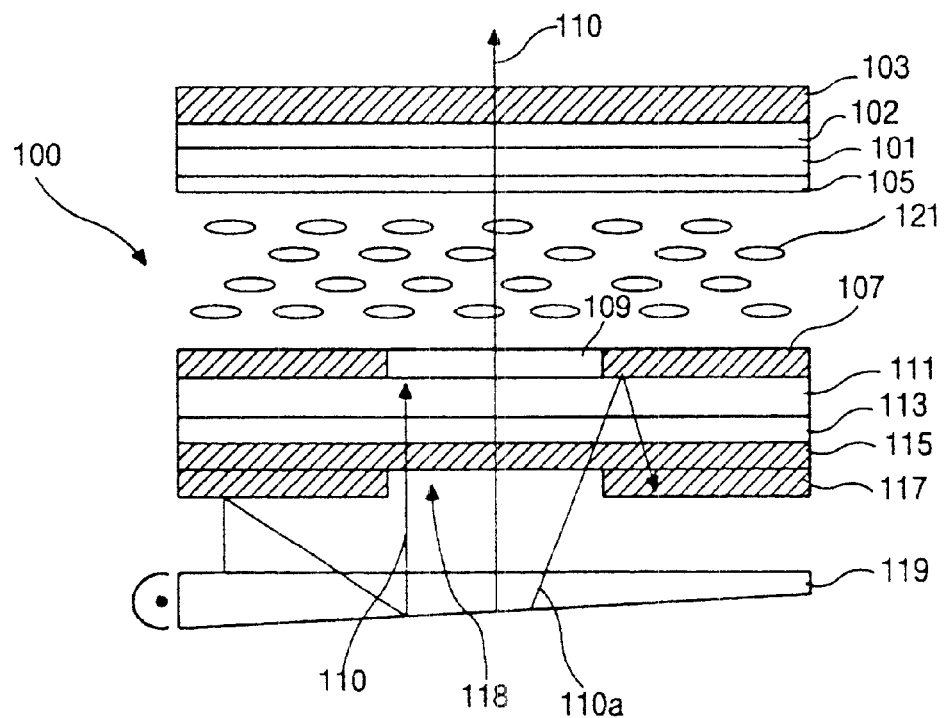
FIG. 5 is a cross-sectional view illustrating a transflective LCD device according to a first preferred embodiment of the present invention.

FIG. 5 is a cross-sectional view illustrating a transflective LCD device according to a first preferred embodiment of the present invention.

As shown in FIG. 5, the transflective LCD device 100 includes upper and lower substrates 101 and 111 with a liquid crystal layer 121 interposed there between. On the upper substrate 101, retardation film 102 with a phase difference λ/4 and an upper polarizer 103 are positioned sequentially. Under the upper substrate 101, a transparent common electrode 105 is positioned. Then a backlight device 119 is positioned under the lower substrate 111.

Although they are not shown, color filters including black matrix are formed between the common electrode 105 and the upper substrate 101.

The lower substrate 111 is opposing to the upper substrate 101 and includes transmitting and reflective portions 109 and 107 that constitute a pixel electrode. The transmitting portion 109 can be an electrode made of transparent conducting material or a transmitting hole. The lower retardation 113 having a phase difference λ/4 is arranged under the lower substrate 111. And then the lower polarizer 115 is positioned under the lower retardation 113. Then reflective film 117 is arranged under the lower polarizer 115. The reflective film 117 has a transmitting region or portion 118 corresponding to the transmitting portion 109 of the pixel electrode. The transmitting region 118 can be a hole for transmitting light.

The reflective film 117 prevents the light 110 from being irradiated into the reflective portion 107 and being absorbed by the lower polarizer 115.

When designing the reflective film 117, the fact that a lot of the light 110a from the backlight device 119 penetrates the lower substrate obliquely could be regarded. Although most of the light 110 from the backlight device 119 can go through the transmitting portion 109 of the pixel electrode by being reflected in the reflective film 117 or passing through the transmitting region 118 directly, some of the light 110a is irradiated on the reflective portion 107.

Figure 6:
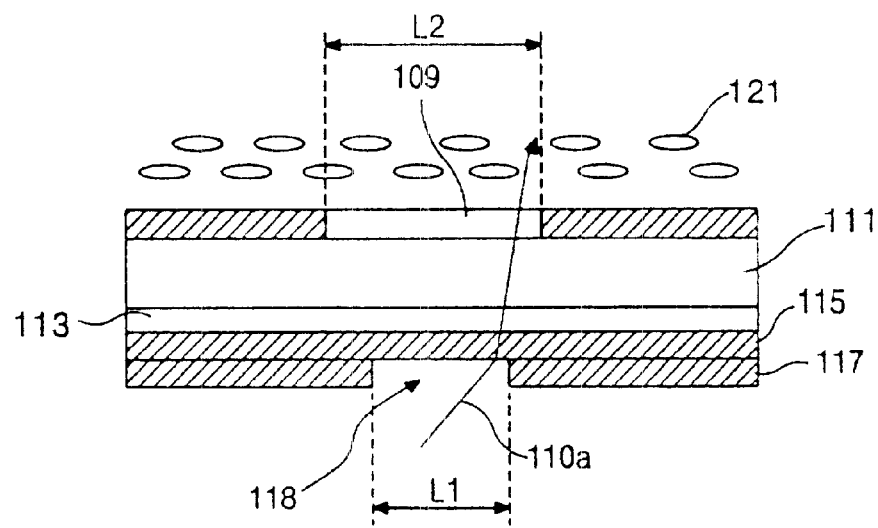
FIG. 6 is a partial cross-sectional view illustrating the transflective LCD device according to a second preferred embodiment of the present invention.
Figure 7:
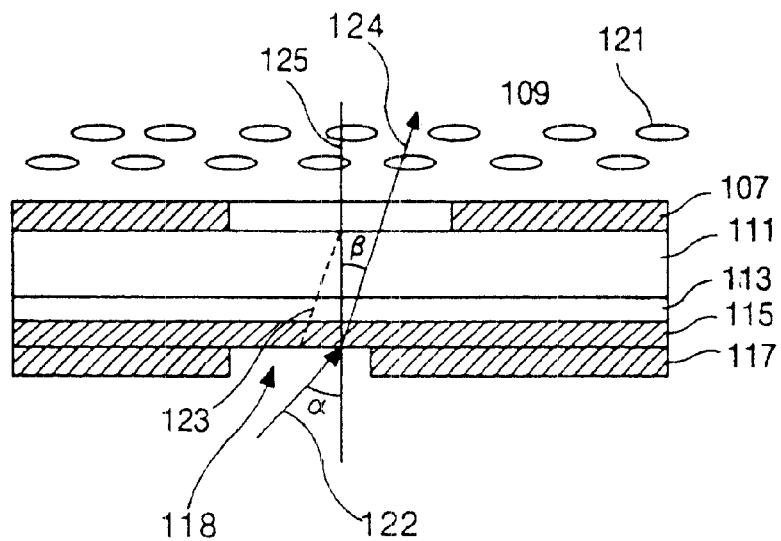
FIG. 7 is a partial cross-sectional view, similar to FIG. 7, illustrating the transflective LCD device according to a second preferred embodiment of the present invention.

To solve the mentioned problem, the length "L1" of the transmitting region, for example a transmitting hole 118, can be shortened (see FIG. 6), or the location of the transmitting hole 118 can be modified (see FIG. 7). The length in FIGS. 6 and 7 can be a barometer of area of the transmitting hole 118.

Referring to FIG. 6, the reflective film 117 is positioned under the lower polarizer 115. The length "L1" of the transmitting hole 118 of the reflective film 117 is narrower than the length "L2" of the transmitting portion 109. Therefore, due to the fact that most incident light 110a transmits the transmitting portion 109, the brightness of the transflective LCD device is improved.

Referring to FIG. 7, the location of the transmitting hole 118 is adjusted. In this structure, the oblique line 123 is defined by connecting the center of the transmitting ortion 109 with the center of the transmitting hole 118. When the light 122 strikes the boundary between two media, it passes through the boundary into the lower polarizer 115, retardation film 113 and substrate 111. At this time, the incident light 122 bends sharply towards the normal line 125. Then, if the refracted light 124 is in parallel to the oblique line 123, the incident light 122 can pass through the transmitting portion 109 into the liquid crystal 121.

Suppose that the angle of incidence is "α" and the angle of refraction is "β". Then, if the lower substrate 111 is glass, it has the index of refraction 1.5. Hence, the result is sin a=1.5sin β using Snell's Law.

As described above, if the transmitting hole 118 is adjusted to make the oblique line 123 parallel to the refracted light 124 having the angle of refraction "β", most of the incident light 122 with an angle of incident "α" can pass through the transmitting portion 109 into the liquid crystal 121.

Figure 8:
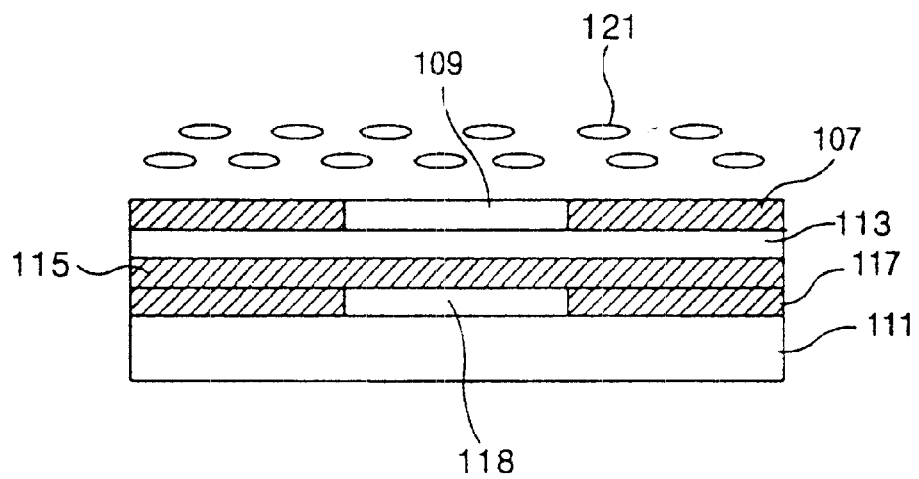
FIG. 8 is a partial cross-sectional view illustrating the transflective LCD device according to a third preferred embodiment of the present invention.

FIG. 8 is a cross-sectional view illustrating the transflective LCD device according to a third preferred embodiment of the present invention. The lower substrate 111 is positioned under the reflective film 117, dissimilar to the first and second embodiments. The third embodiment of the invention provides transflective LCD device, including: the pixel electrode, under the liquid crystal 121, having the transparent and reflective electrodes 109 and 107; the lower retardation film 113 under the pixel electrode; the lower polarizer 115 under the lower retardation film 113; the reflective film 117, under the lower polarizer 115, having transmitting hole 118; and the substrate 111 under the reflective film 118.

As mentioned above, the substrate 111 is not positioned between the reflective film 117 and the reflective electrode 107, and thus the distance between the pixel electrode and the reflective film 117 is shortened. In this case, when designing the area of the transmitting region 118 of the reflective film 117, the changed distance could be regarded. And this structure can also help to reduce the amount of the incident light 122 irradiated on the reflective electrode 107.

As described herein before, using the transflective LCD device according to the preferred embodiments of the present invention, since the reflective film 117 is arranged in the lower part of the transflective LCD panel, the light from the backlight device is not absorbed in the lower polarizer and can passes through the lower substrate into the liquid crystal. Therefore, good brightness of the LCD device can be achieved.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A transflective liquid crystal display device, comprising:
   an upper substrate;
   a lower substrate;
   a pixel electrode arranged on the lower substrate and having reflective and transmitting portions;
   liquid crystal interposed between the upper substrate and the lower substrates;
   a backlight device arranged under the lower substrate and irradiating the light to the liquid crystal through the transmitting portion of the pixel electrode; and
   a reflector to prevent the light from the backlight device from radiating on the reflective portion of the pixel electrode.

2. The transflective LCD device of claim 1, further comprising, a lower retardation film under the lower substrate.

3. The transflective LCD device of claim 2, further comprising, a lower polarizer arranged under the lower retardation film.

4. The transflective LCD device of claim 1, wherein the reflector is positioned under the lower substrate.

5. The transflective LCD device of claim 4, wherein the reflector has a transmitting region in order to transmit the light from the backlight device to the transmitting portion of the pixel electrode.

6. The transflective LCD device of claim 5, wherein area of the transmitting region of the reflector is smaller than that of the transmitting portion of the pixel electrode.

7. The transflective LCD device of claim 4, further comprising, a lower polarizer under the lower substrate and wherein the reflector is arranged under the lower polarizer.

8. The transflective LCD device of claim 7, wherein the reflector has a transmitting region in order to transmit the light from the backlight device to the transmitting portion of the pixel electrode.

9. The transflective LCD device of claim 8, wherein area of the transmitting region of the reflector is smaller than that of the transmitting portion of the pixel electrode.

10. The transflective LCD device of claim 1, further comprising a polarizer on the lower substrate and wherein the reflector is positioned between the polarizer and the lower substrate.

11. The transflective LCD device of claim 1, wherein the reflective electrode is made of the metallic material selected from a group composing of Aluminum, Tungsten, Molybdenum and the like.

12. The transflective LCD device of claim 1, wherein the transparent portion is comprised of transparent conductive metallic material.

13. The transflective LCD device of claim 1, wherein the transparent portion of the pixel electrode is a transmitting hole.

14. The transflective liquid crystal display device, comprising:
- an upper substrate;
- an upper polarizer on the upper substrate;
- color filters under the upper substrate;
- a common electrode under the color filters;
- liquid crystal under the common electrode;
- a switching device under the liquid crystal;
- a pixel electrode, under the liquid crystal, having the transmitting and reflective portions and having an electrical connection with the switching device;
- a lower substrate under the pixel electrode;
- a lower polarizer under the lower substrate;
- a reflective film, under the lower polarizer, having transmitting region;
- a backlight device, under the reflective film, irradiating the light; and
- wherein the light from the backlight device reaches the transmitting portion of the pixel electrode through the transmitting area of the reflective film.

15. The transflective LCD device of claim 12, wherein area of the transmitting region is smaller than that of the transmitting portion of the pixel electride.

16. The transflective liquid crystal display device, comprising:
- an upper substrate;
- an upper retardation film on the upper substrate;
- an upper polarizer on the upper retardation film;
- color filters under the substrate;
- a common electrode under the color filters;
- liquid crystal under the common electrode;
- a switching device under the liquid crystal;
- a pixel electrode, under the liquid crystal, having the transmitting and reflective portions and having an electrical connection with the switching device;
- a lower retardation film under the pixel electrode;
- a lower polarizer under the lower retardation film;
- a reflective film, under the lower polarizer, having transmitting region;
- a substrate under the reflective film;
- a backlight device, under the reflective film, irradiating the light; and
- wherein the light from the backlight device reaches the transmitting portion of the pixel electrode through the transmitting area of the reflective film.

* * * * *